(12) United States Patent
Kato

(10) Patent No.: US 11,593,049 B2
(45) Date of Patent: Feb. 28, 2023

(54) PRINTER, NON-TRANSITORY COMPUTER READABLE MEDIUM, AND PRINT SYSTEM FOR EXECUTING PRINTING CONSIDERING LIMITED FUNCTIONS

(71) Applicant: FUJIFILM BUSINESS INNOVATION CORP., Tokyo (JP)

(72) Inventor: Natsuko Kato, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 287 days.

(21) Appl. No.: 16/812,590

(22) Filed: Mar. 9, 2020

(65) Prior Publication Data

US 2021/0026574 A1 Jan. 28, 2021

(30) Foreign Application Priority Data

Jul. 23, 2019 (JP) .............................. JP2019-135281

(51) Int. Cl.
*G06F 3/12* (2006.01)
(52) U.S. Cl.
CPC ............ *G06F 3/126* (2013.01); *G06F 3/1207* (2013.01)
(58) Field of Classification Search
None
See application file for complete search history.

(56) References Cited

U.S. PATENT DOCUMENTS

| 9,292,236 | B2 | 3/2016 | Ding et al. |
| 9,521,277 | B1* | 12/2016 | Johnson ............. H04N 1/00363 |
| 9,965,229 | B2 | 5/2018 | Ding et al. |
| 2013/0050743 | A1* | 2/2013 | Steely .................... G06F 3/1204 358/1.15 |
| 2013/0077128 | A1* | 3/2013 | Ichida .................... G06F 3/1244 358/1.15 |
| 2015/0153981 | A1* | 6/2015 | Iwasaki .............. H04N 1/00344 358/1.14 |
| 2015/0248258 | A1* | 9/2015 | Ding .................... G06F 3/1222 358/1.15 |
| 2019/0347051 | A1* | 11/2019 | Ogata .................... G06F 3/1239 |
| 2020/0089440 | A1* | 3/2020 | Takeo .................... G06F 3/1205 |
| 2020/0301636 | A1* | 9/2020 | Kurosawa ............. G06F 3/1253 |

FOREIGN PATENT DOCUMENTS

| JP | 2015-165394 A | 9/2015 |
| JP | 2017-139013 A | 8/2017 |

\* cited by examiner

*Primary Examiner* — Henok Shiferaw
(74) *Attorney, Agent, or Firm* — Oliff PLC

(57) ABSTRACT

A printer includes a reception unit, an acquisition unit, and a printing unit. The reception unit receives a second print job including print data containing embedded storage location information indicating a storage location of a first print job from a relay unit that receives a print job from a user terminal, transmits the print job designating limited functions to the printer, the limited functions being a limited subset of functions that a printer treated as a relay destination is capable of achieving, and does not transmit the print job designating a function other than the limited functions to the printer. The acquisition unit acquires the first print job from the storage location indicated by the storage location information. The printing unit executes printing based on the first print job.

20 Claims, 11 Drawing Sheets

PRINTER, NON-TRANSITORY COMPUTER READABLE MEDIUM, AND PRINT SYSTEM FOR EXECUTING PRINTING CONSIDERING LIMITED FUNCTIONS

CROSS-REFERENCE TO RELATED APPLICATIONS

This application is based on and claims priority under 35 USC 119 from Japanese Patent Application No. 2019-135281 filed Jul. 23, 2019.

BACKGROUND

(i) Technical Field

The present disclosure relates to a printer, a non-transitory computer readable medium, and a print system.

(ii) Related Art

Japanese Unexamined Patent Application Publication No. 2015-165394 discloses a printing device that includes one or more processors and memory that stores an instruction. In the case where the instruction is processed by the one or more processors, print job settings data of a lock print job is received from a cloud printing service provider. The print job settings data includes data that identifies a user and a storage position in the cloud printing service provider of print data related to the lock print job. In the case where the print data is processed by a printing device, a printout of an electronic document expressed by the print data is generated, an estimated time of a deadline for the print data is determined at least partially on the basis of the print job settings data. By determining that the estimated time of the deadline for the print data is within a specified period with respect to the current time, the print data is detected to be close to the deadline on the basis of the estimated time of the deadline. In response to detecting that the print data is close to the deadline, a warning indicating that the print data is close to the deadline is transmitted to the user.

Japanese Unexamined Patent Application Publication No. 2017-139013 discloses a print system including an information processing apparatus that directs printing using a print service system, and an image forming apparatus that receives and prints print data transmitted from the print service system. The information processing apparatus includes an identification information acquirer that acquires, by short-range communication, identification information about the image forming apparatus in the print service system, a print function information acquirer that acquires capability information indicating print-related capabilities of the image forming apparatus corresponding to the acquired identification information from the print service system, a print settings receiver that receives print settings from the user using the acquired capability information, and a transmission processor that performs a process for transmitting information about the received print settings to the image forming apparatus. The image forming apparatus includes a provider that provides identification information of the image forming apparatus itself in the print service system to the information processing apparatus by short-range communication.

SUMMARY

In recent years, cloud services have appeared in which a server manages a printer, relays a print job from a user terminal, and causes the printer to print the print job. In cases where multiple printers are managed, the functions of the multiple printers are not necessarily uniform. In such cases, the server receives the print job from the user terminal while limiting available functions to a minimum set of functions executable by the printers. In other words, the server does not relay, to the printer, a print job designating a function not included in the limited set of functions. With this arrangement, even if the server is managing a printer capable of achieving a function designated by the print job, the print job may not be transmitted to the printer.

Aspects of non-limiting embodiments of the present disclosure relate to printing based on demand in the case where a relay unit relays a print job, even if a user is requesting to use a function not included in a limited set of functions.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a printer provided with a reception unit, an acquisition unit, and a printing unit. The reception unit receives a second print job including print data containing embedded storage location information indicating a storage location of a first print job from a relay unit that receives a print job from a user terminal, transmits the print job designating limited functions to the printer, the limited functions being a limited subset of functions that a printer treated as a relay destination is capable of achieving, and does not transmit the print job designating a function other than the limited functions to the printer. The acquisition unit acquires the first print job from the storage location indicated by the storage location information. The printing unit executes printing based on the first print job.

BRIEF DESCRIPTION OF THE DRAWINGS

An exemplary embodiment of the present disclosure will be described in detail based on the following figures, wherein.

DETAILED DESCRIPTION

Figure 1:
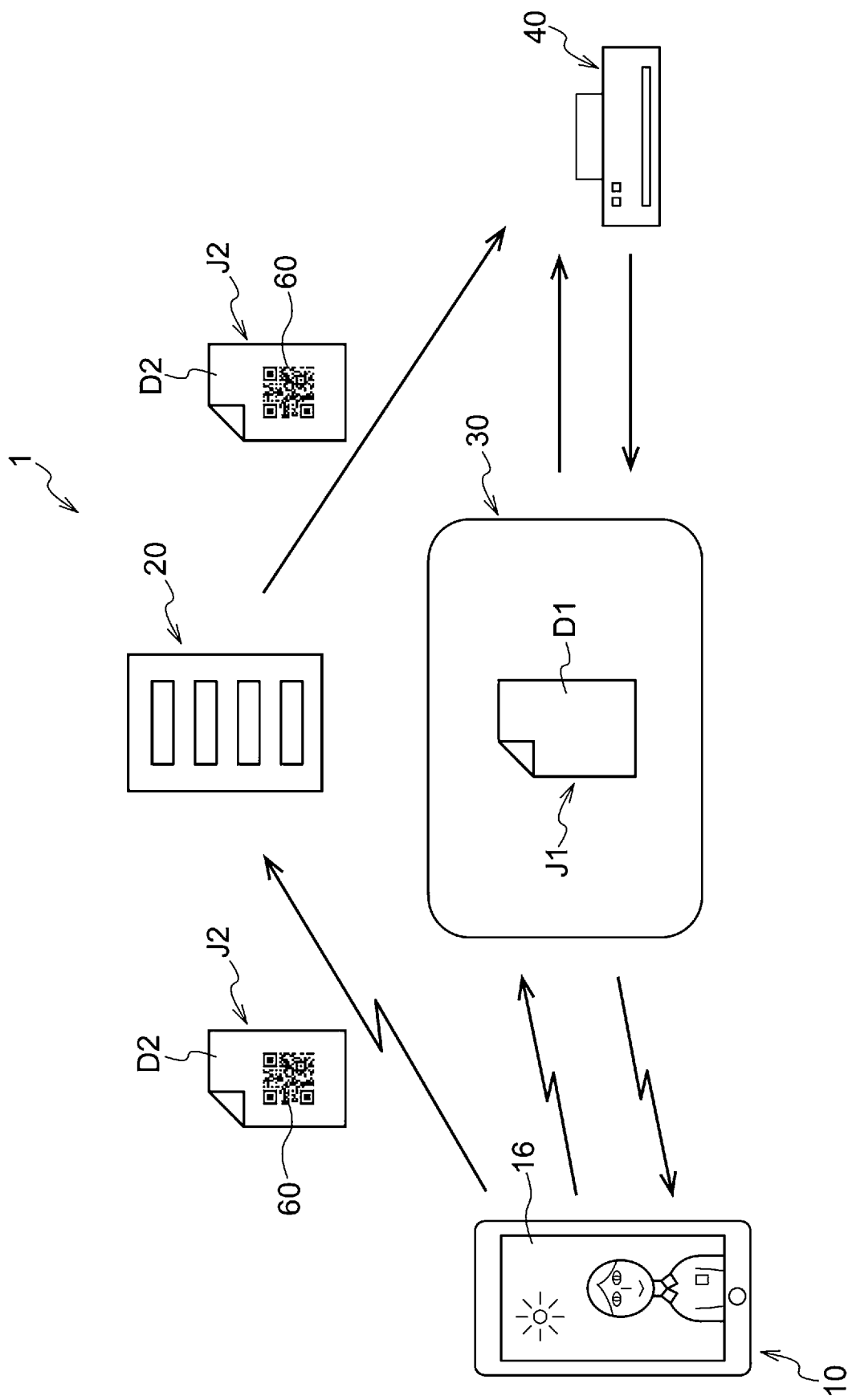
FIG. 1 is a diagram illustrating a schematic configuration of a print system according to an exemplary embodiment.

Hereinafter, an exemplary embodiment of the technology according to the present disclosure will be described with reference to the drawings. Note that in the drawings, identical or similar components and portions are denoted with the same reference signs. Also, the dimension ratios in the drawings have been exaggerated for clarity, and may be different from the actual ratios in some cases.

FIG. 1 is a diagram illustrating a schematic configuration of a print system according to the exemplary embodiment.

As illustrated in FIG. 1, a print system 1 includes a user terminal 10, a server 20 that acts as one example of a relay unit, cloud storage 30 that acts as one example of a storage location, and a printer 40.

As an example, the print system 1 is a system in which the user terminal 10, the printer 40 located in a different place than the user terminal 10, the server 20 that provides a print service using the cloud, and the cloud storage 30 that provides a storage service using the cloud are connected over the Internet and/or a wired or wireless network. In FIG. 1, the print system 1 is illustrated as a system connected over a wireless network as an example.

The user terminal 10 is an apparatus that creates and manages a first print job J1 including first print data D1 to be printed by the printer 40. The first print data D1 is one example of print data included in the first print job J1. The user terminal 10 includes a display unit 16, and is configured such that an input unit is displayed on the display unit 16. For example, the user terminal 10 creates the first print job J1 including the first print data D1 through the input unit displayed on the display unit 16, and an image based on the first print job J1 is displayed on the display unit 16. The first print job J1 includes information such as print settings information to be used when the printer 40 prints the first print data D1. In the exemplary embodiment, the print settings information includes print settings information for causing the printer 40 to perform functions other than "limited functions", which are a limited subset of the functions that the printer 40 managed by the server 20 is capable of achieving. The content of the first print job J1 will be described later.

Additionally, the user terminal 10 creates a second print job J2 including second print data D2 containing an embedded two-dimensional matrix code 60 indicating the storage location of the first print job J1. The two-dimensional matrix code 60 is one example of storage location information. The second print data D2 is one example of print data containing embedded storage location information. For example, the user terminal 10 creates the second print job J2 including the second print data D2 through the input unit displayed on the display unit 16, and an image based on the second print job J2 is displayed on the display unit 16.

The second print job J2 is a print job designating the "limited functions". The user terminal 10 transmits the second print job J2 including the second print data D2 to the server 20 as an apparent print job. The specification configuration and action of the user terminal 10 will be described later.

The server 20 is a cloud server that provides a print service using the cloud. The server 20 receives the second print job J2 including the second print data D2 transmitted from the user terminal 10. Furthermore, the server 20 transmits the second print job J2 including the second print data D2 to the printer 40. The server 20 transmits a print job designating the "limited functions" (for example, the second print job J2) to the printer 40, but does not transmit a print job designating functions other than the "limited functions" (for example, the first print job J1) to the printer 40.

The cloud storage 30 is an external storage apparatus that provides a storage service using the cloud. The cloud storage 30 stores the first print job J1 including the first print data D1 transmitted from the user terminal 10. Also, the cloud storage 30 receives a print status of the first print job J1 from the printer 40. In the exemplary embodiment, the cloud storage 30 notifies the user terminal 10 of the print status of the first print job J1 in response to polling from the user terminal 10. The specification configuration and action of the cloud storage 30 will be described later.

The printer 40 is an apparatus that prints onto a recording medium according to an instruction from the user terminal 10. The printer 40 receives the second print job J2 transmitted from the server 20 and reads the two-dimensional matrix code 60 as storage location information embedded in the second print data D2 of the second print job J2. In addition, the printer 40 acquires the first print job J1 from the cloud storage 30 as the storage location read from the two-dimensional matrix code 60. Subsequently, the printer 40 prints the first print data D1 based on the first print job J1. The specific configuration and action of the printer 40 will be described later.

Figure 2:
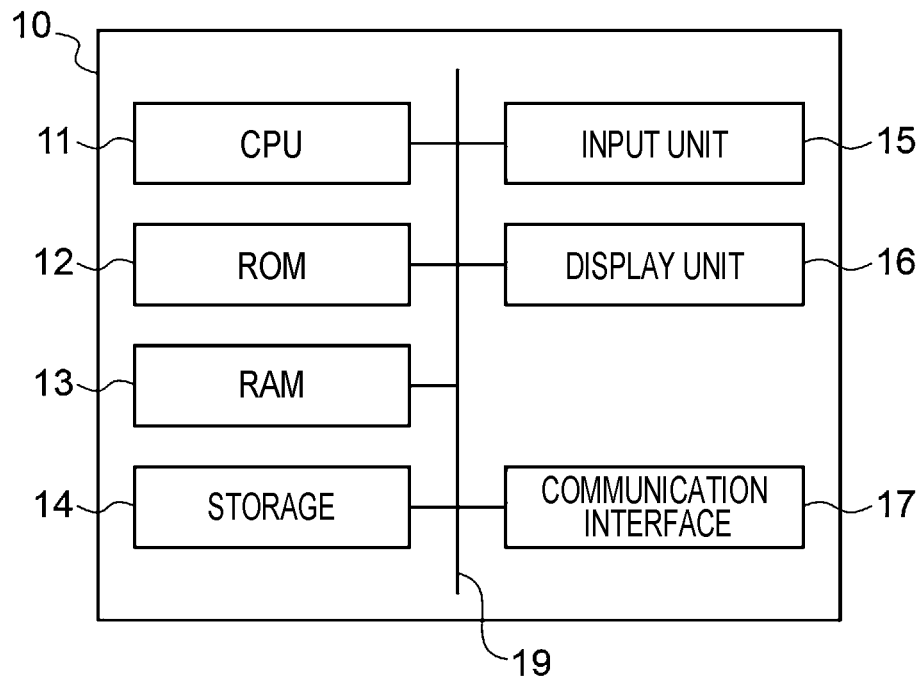
FIG. 2 is a block diagram illustrating a hardware configuration of a user terminal.

FIG. 2 is a block diagram illustrating a hardware configuration of the user terminal 10.

As illustrated in FIG. 2, the user terminal 10 includes a central processing unit (CPU) 11, read-only memory (ROM) 12, random access memory (RAM) 13, storage 14, an input unit 15, a display unit 16, and a communication interface 17. These components are communicably interconnected through a bus 19.

The CPU 11 is a central processing unit that executes various programs and controls each unit. In other words, the CPU 11 reads out a program from the ROM 12 or the storage 14, and executes the program while using the RAM 13 as a work area. The CPU 11 controls each unit as above and performs various arithmetic processing in accordance with the program recorded in the ROM 12 or the storage 14. In the exemplary embodiment, a printing program is stored in the ROM 12 or the storage 14.

The ROM 12 stores various programs and various data. The RAM 13 temporarily stores programs or data as a work area. The storage 14 includes a hard disk drive (HDD) or a solid-state drive (SSD), and stores various programs, including an operating system, as well as various data. A printer driver program is stored in the storage 14. By reading out the printer driver program from the storage 14 and executing the program, the CPU 11 functions as a printer driver.

The display unit 16 is a liquid crystal display, for example, and displays various information. The display unit 16 is equipped with a touch panel, and a part of the display unit 16 functions as the input unit 15. The input unit 15 is used to perform various inputs. Note that instead of a touch panel, the input unit 15 may also be configured to include a pointing device such as a mouse, and a keyboard.

The communication interface 17 is an interface for communicating with other equipment such as the server 20 and the cloud storage 30, and implements a standard such as Ethernet (registered trademark), FDDI, or Wi-Fi (registered trademark), for example.

Figure 3:
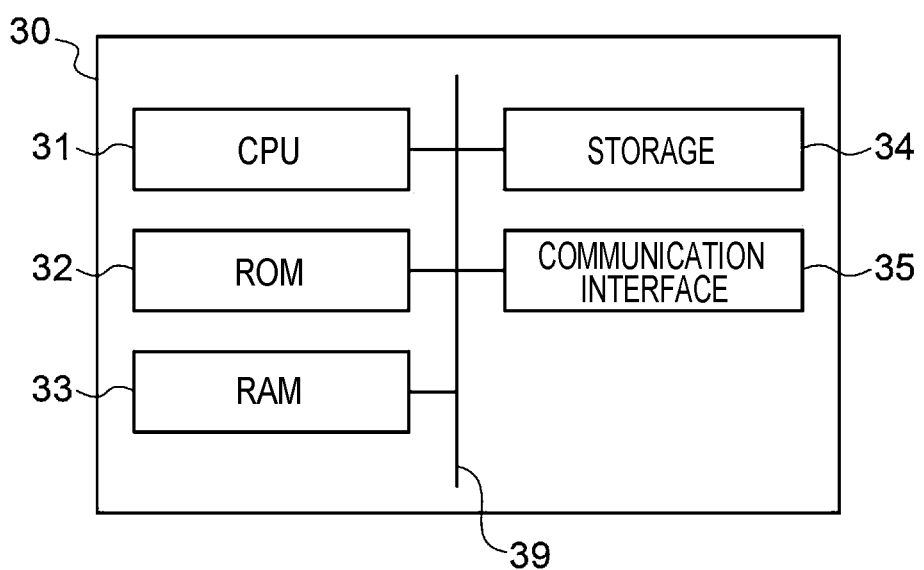
FIG. 3 is a block diagram illustrating a hardware configuration of cloud storage.

FIG. 3 is a block diagram illustrating a hardware configuration of the cloud storage 30.

As illustrated in FIG. 3, the cloud storage 30 includes a CPU 31, ROM 32, RAM 33, storage 34, and a communication interface 35. These components are communicably interconnected through a bus 39.

The CPU 31 is a central processing unit that executes various programs and controls each unit. In other words, the CPU 31 reads out a program from the ROM 32 or the storage 34, and executes the program while using the RAM 33 as a work area. The CPU 31 controls each unit as above and performs various arithmetic processing in accordance with the program recorded in the ROM 32 or the storage 34. In the exemplary embodiment, a printing program is stored in the ROM 32 or the storage 34.

The ROM 32 stores various programs and various data. The RAM 33 temporarily stores programs or data as a work area. The storage 34 includes a hard disk drive (HDD) or a solid-state drive (SSD), and stores various programs, including an operating system, as well as various data.

The communication interface 35 is an interface for communicating with other equipment such as the user terminal 10 and the printer 40, and implements a standard such as Ethernet (registered trademark), FDDI, or Wi-Fi (registered trademark), for example.

Figure 4:
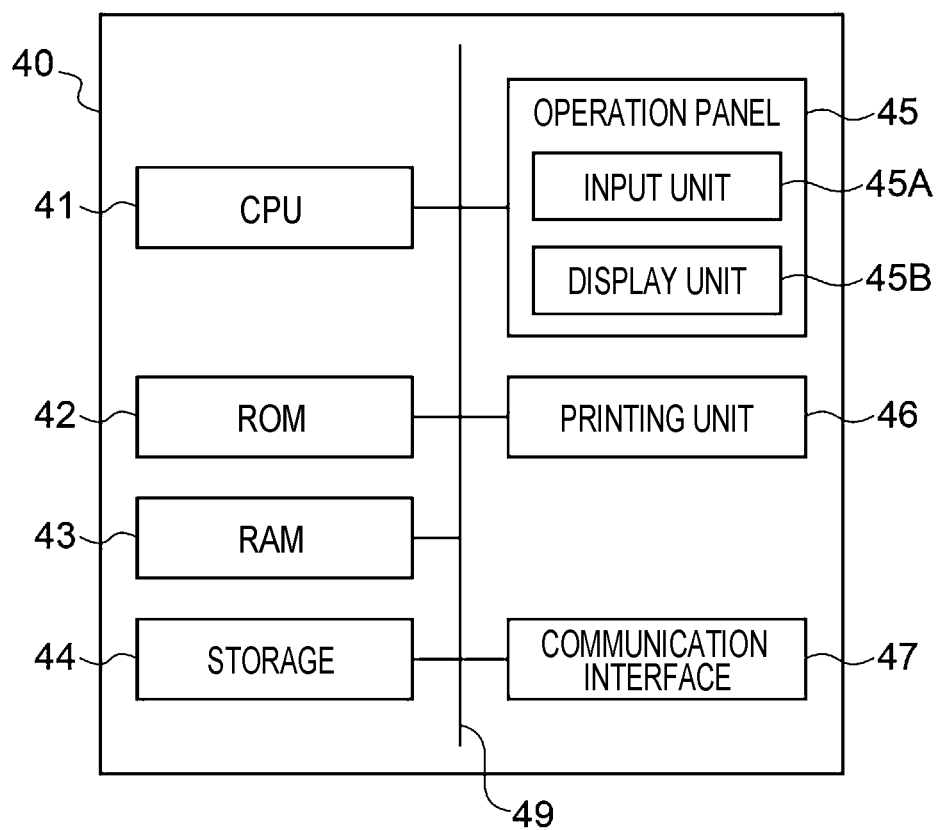
FIG. 4 is a block diagram illustrating a hardware configuration of a printer.

FIG. 4 is a block diagram illustrating a hardware configuration of the printer 40.

As illustrated in FIG. 4, the printer 40 includes a CPU 41, ROM 42, RAM 43, storage 44, an operation panel 45, a printing unit 46, and a communication interface 47. These components are communicably interconnected through a bus 49.

The CPU 41 is a central processing unit that executes various programs and controls each unit. In other words, the CPU 41 reads out a program from the ROM 42 or the storage 44, and executes the program while using the RAM 43 as a work area. The CPU 41 controls each unit as above and performs various arithmetic processing in accordance with the program recorded in the ROM 42 or the storage 44. In the exemplary embodiment, a printing program is stored in the ROM 42 or the storage 44.

The ROM 42 stores various programs and various data. The RAM 43 temporarily stores programs or data as a work area. The storage 44 includes a hard disk drive (HDD) or a solid-state drive (SSD), and stores various programs, including an operating system, as well as various data.

The operation panel 45 includes an input unit 45A and a display unit 45B. The display unit 45B is a liquid crystal display, for example, and displays various information. The display unit 45B is equipped with a touch panel, and a part of the display unit 45B functions as the input unit 45A.

The printing unit 46 prints the first print data D1 based on the first print job J1 onto a recording medium. For example, the printing unit 46 prints the first print data D1, or in other words, forms the first print data D1, on a recording medium with an electrophotographic system. The printing unit 46 is provided with components such as a process unit that forms a toner image, a transfer unit that transfers the toner image onto the recording medium, and a fusing unit that fuses the toner image transferred onto the recording medium to the recording medium. Note that the printing unit 46 may also form the first print data D1 on the recording medium with an inkjet system instead of an electrophotographic system.

The communication interface 47 is an interface for communicating with other equipment such as the server 20, and implements a standard such as Ethernet (registered trademark), FDDI, or Wi-Fi (registered trademark), for example.

Next, a functional configuration of the user terminal 10, the cloud storage 30, and the printer 40 will be described.

Figure 5:
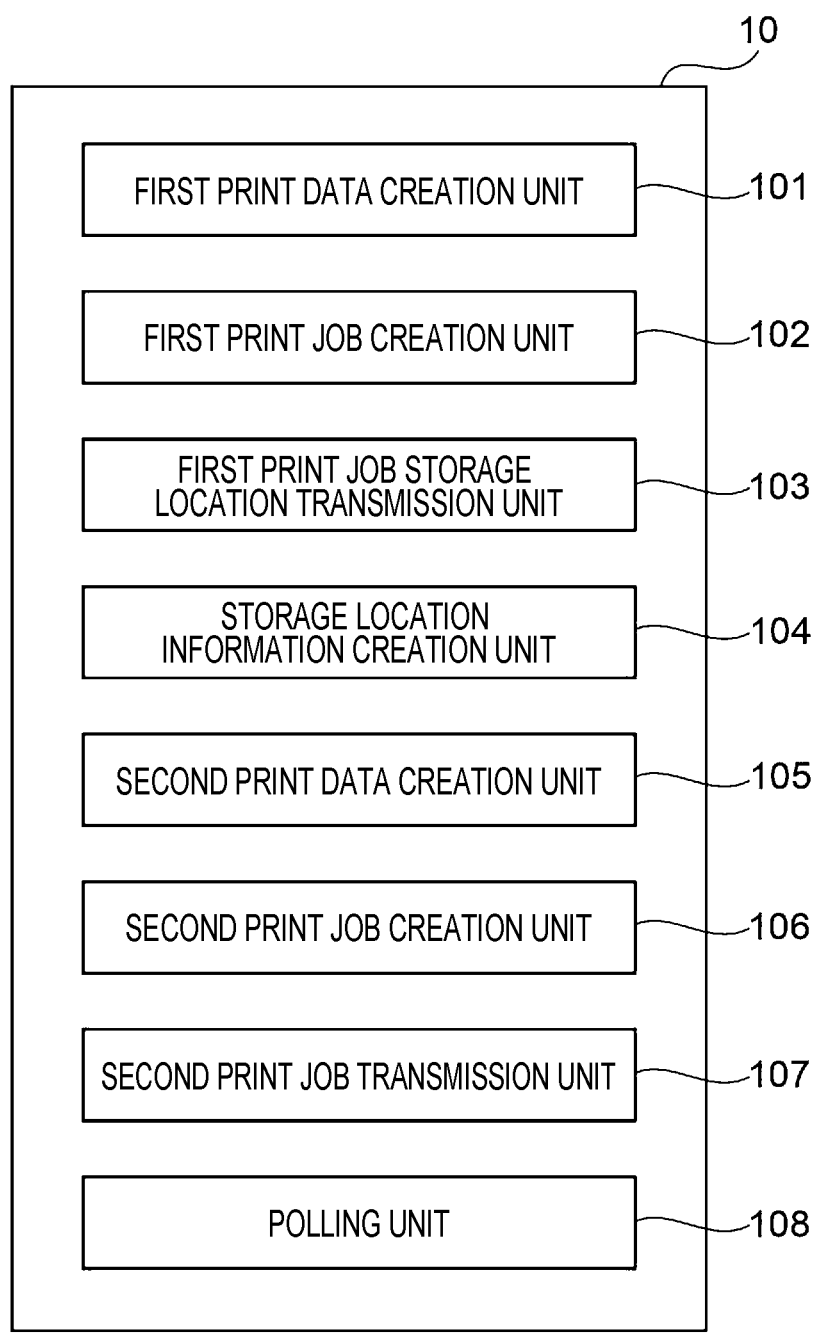
FIG. 5 is a block diagram illustrating an example of a functional configuration of a user terminal.

FIG. 5 is a block diagram illustrating an example of a functional configuration of the user terminal 10.

As illustrated in FIG. 5, the user terminal 10 includes a first print data creation unit 101, a first print job creation unit 102, a first print job storage location transmission unit 103, a storage location information creation unit 104, a second print data creation unit 105, a second print job creation unit 106, a second print job transmission unit 107, and a polling unit 108 as functional components. These functional components are achieved by having the CPU 11 read out the printing program stored in the ROM 12 or the storage 14, load the printing program into the RAM 13, and execute the printing program.

The first print data creation unit 101 creates the first print data D1 (see FIG. 1) to be printed by the printer 40. The first print data D1 may be created by the user inputting data using the input unit 15 of the user terminal 10, or the first print data D1 may be created using data received from other equipment by the communication interface 17 of the user terminal 10.

The first print job creation unit 102 creates the first print job J1 including the first print data D1. The first print job J1 includes print settings for printing the first print data D1. The print settings include functions that the printer 40 is capable of achieving, and "limited functions", which are a limited subset of the functions that the printer 40 is capable of achieving. Herein, the "limited functions" are functions determined by the server 20 as a common set of functions that are executable by general-purpose printers, and included settings such as a color/black-and-white setting, a paper size setting, and a number of copies settings. In the exemplary embodiment, the limited functions acquired from the server 20 are stored in the ROM 12 or the storage 14. Functions other than the "limited functions" that the printer 40 is capable of achieving include functions such as authentication that permits only a specific user to execute print processes, a per-page color setting, switching to or from duplex within the first print job J1, image correction instructions, or post-processing such as stapling and hole-punching, for example.

The first print job storage location transmission unit 103 transmits the first print job J1 including the first print data D1 and the print settings to the cloud storage 30.

The storage location information creation unit 104 creates storage location information indicating the storage location of the first print job J1, namely the cloud storage 30. In the exemplary embodiment, the two-dimensional matrix code 60 (see FIG. 1) indicating a storage location Uniform Resource Locator (URL) and account information expressing the right to use the network is created as the storage location information. The two-dimensional matrix code 60 may be a QR code (registered trademark), for example.

The second print data creation unit 105 creates the second print data D2 (see FIG. 1) containing the embedded two-dimensional matrix code 60. In the exemplary embodiment, the second print data D2 is print data in which the two-dimensional matrix code 60 is embedded on the first page.

The second print job creation unit 106 creates the second print job J2 including the second print data D2. The second print job J2 includes print settings of the second print data D2 designating the "limited functions", and the content of the first print job J1. The content of the first print job J1 is information such as the name of the first print job J1 (for example, the file name of a file to be printed) and the first print data D1 to be printed, for example. With this arrangement, the second print job J2 is transmitted from the user terminal 10 to the printer 40 through the server 20, and when printing based on the first print job J1 is executed by the printer 40, the content of the first print data D1 to be printed is understood. From the perspective of reducing the data volume of the second print job J2, the content of the first print job J1 is preferably a portion of the first print data D1 to be printed, more preferably only one page of the first print data D1, even more preferably only the first page of the first print data D1.

The second print job transmission unit 107 transmits the second print job J2 including the second print data D2 to the server 20. In other words, the second print job transmission unit 107 transmits the second print job J2 including the second print data D2 containing the embedded two-dimensional matrix code 60 to the server 20 as an apparent print job.

The polling unit 108 polls the cloud storage 30 for the print status based on the first print job J1.

Figure 6:
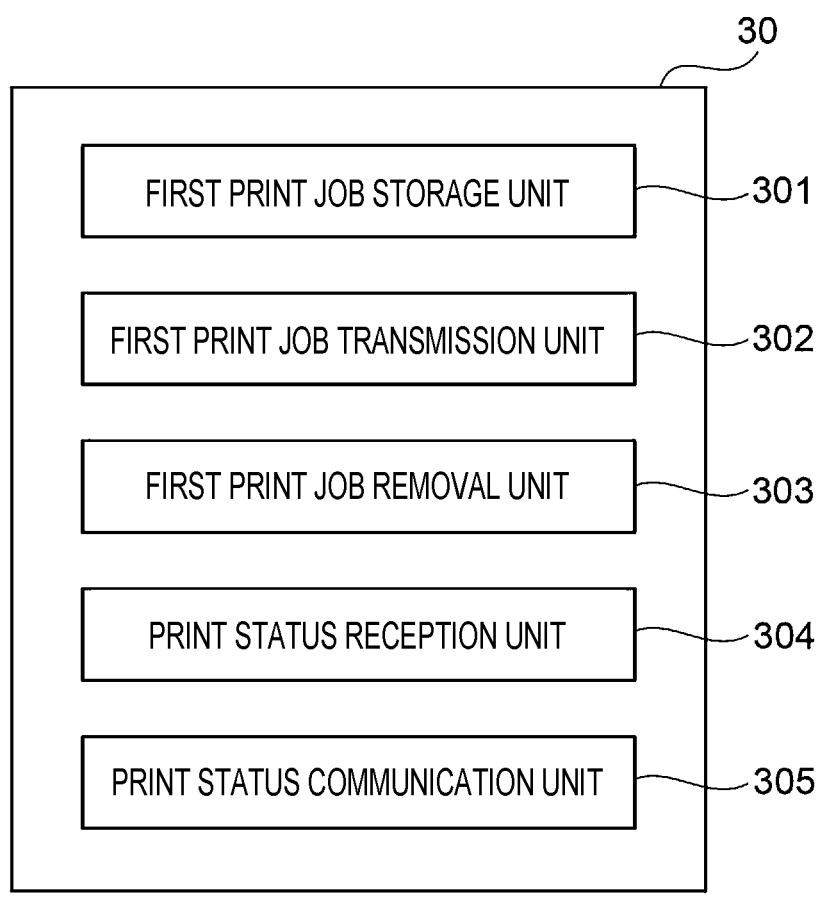
FIG. 6 is a block diagram illustrating an example of a functional configuration of cloud storage.

FIG. 6 is a block diagram illustrating an example of a functional configuration of the cloud storage 30.

As illustrated in FIG. 6, the cloud storage 30 includes a first print job storage unit 301 that acts as one example of a storage unit, a first print job transmission unit 302, a first print job removal unit 303, a print status reception unit 304, and a print status communication unit 305 that acts as one example of a notification unit as functional components. These functional components are achieved by having the CPU 31 read out the printing program stored in the ROM 32 or the storage 34, load the printing program into the RAM 33, and execute the printing program.

The first print job storage unit 301 stores the first print job J1 transmitted from the user terminal 10.

The first print job transmission unit 302 transmits the first print job J1 stored in the first print job storage unit 301 to the printer 40 according to a request from the printer 40.

The first print job removal unit 303 removes the first print job J1 stored in the first print job storage unit 301. In the exemplary embodiment, the first print job removal unit 303 removes the first print job J1 stored in the first print job storage unit 301 after receiving "printing complete" information from the print status reception unit 304. As another example, the first print job removal unit 303 may also remove the first print job J1 stored in the first print job storage unit 301 when a removal request is received from the printer 40.

The print status reception unit 304 receives the print status of printing executed on the basis of the first print job J1 from the printer 40.

The print status communication unit 305 issues a notification of the print status of printing executed on the basis of the first print job J1 according to polling from the polling unit 108 of the user terminal 10.

Figure 7:
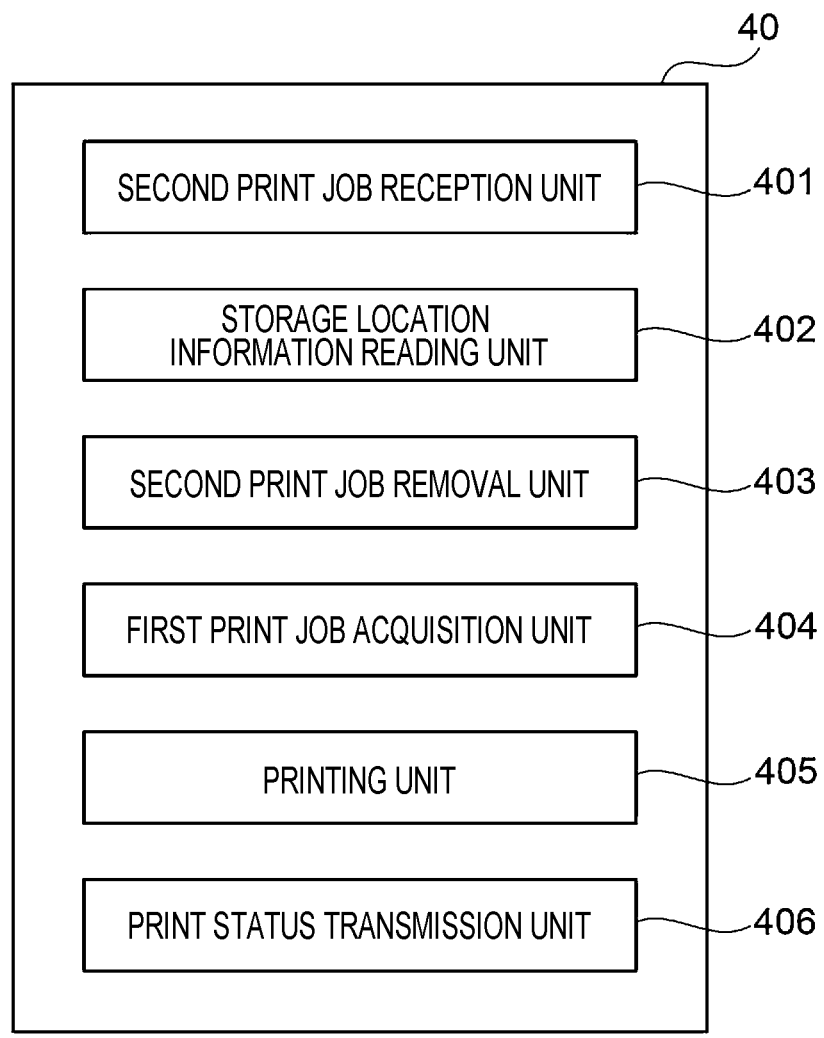
FIG. 7 is a block diagram illustrating an example of a functional configuration of a printer.

FIG. 7 is a block diagram illustrating an example of a functional configuration of the printer 40.

As illustrated in FIG. 7, the printer 40 includes a second print job reception unit 401, a storage location information reading unit 402, a second print job removal unit 403, a first print job acquisition unit 404, a printing unit 405, and a print status transmission unit 406 that acts as one example of a transmission unit as functional components. These functional components are achieved by having the CPU 41 read out the printing program stored in the ROM 42 or the storage 44, load the printing program into the RAM 43, and execute the printing program.

The second print job reception unit 401 receives the second print job J2 transmitted by the server 20.

The storage location information reading unit 402 reads the two-dimensional matrix code 60 embedded in the second print data D2 of the second print job J2. In the exemplary embodiment, a storage location URL indicating the cloud storage 30 and account information are read from the two-dimensional matrix code 60.

The second print job removal unit 403 removes the second print job J2. In the exemplary embodiment, the second print job J2 is removed after the storage location of the first print job J1 is read from the two-dimensional matrix code 60.

The first print job acquisition unit 404 acquires the first print job J1 from the storage location read by the storage location information reading unit 402, namely the cloud storage 30.

The printing unit 405 prints the first print data D1 based on the first print job J1. The first print job J1 includes print settings designating functions other than the above "limited functions" not relayed by the server 20.

The print status transmission unit 406 transmits the print status of the first print data D1 based on the first print job J1 to the cloud storage 30. For example, the print status transmission unit 406 transmits a print status such as "ready to print", "printing", or "printing complete" to the cloud storage 30.

Next, the action of the print system will be described.

The print processes executed by the print system 1 as a whole are performed by being divided up among the user terminal 10, the server 20, the cloud storage 30, and the printer 40. Consequently, in the following, the portions of the print processes respectively handled by the user terminal 10, the server 20, the cloud storage 30, and the printer 40 will be described.

Figure 8:
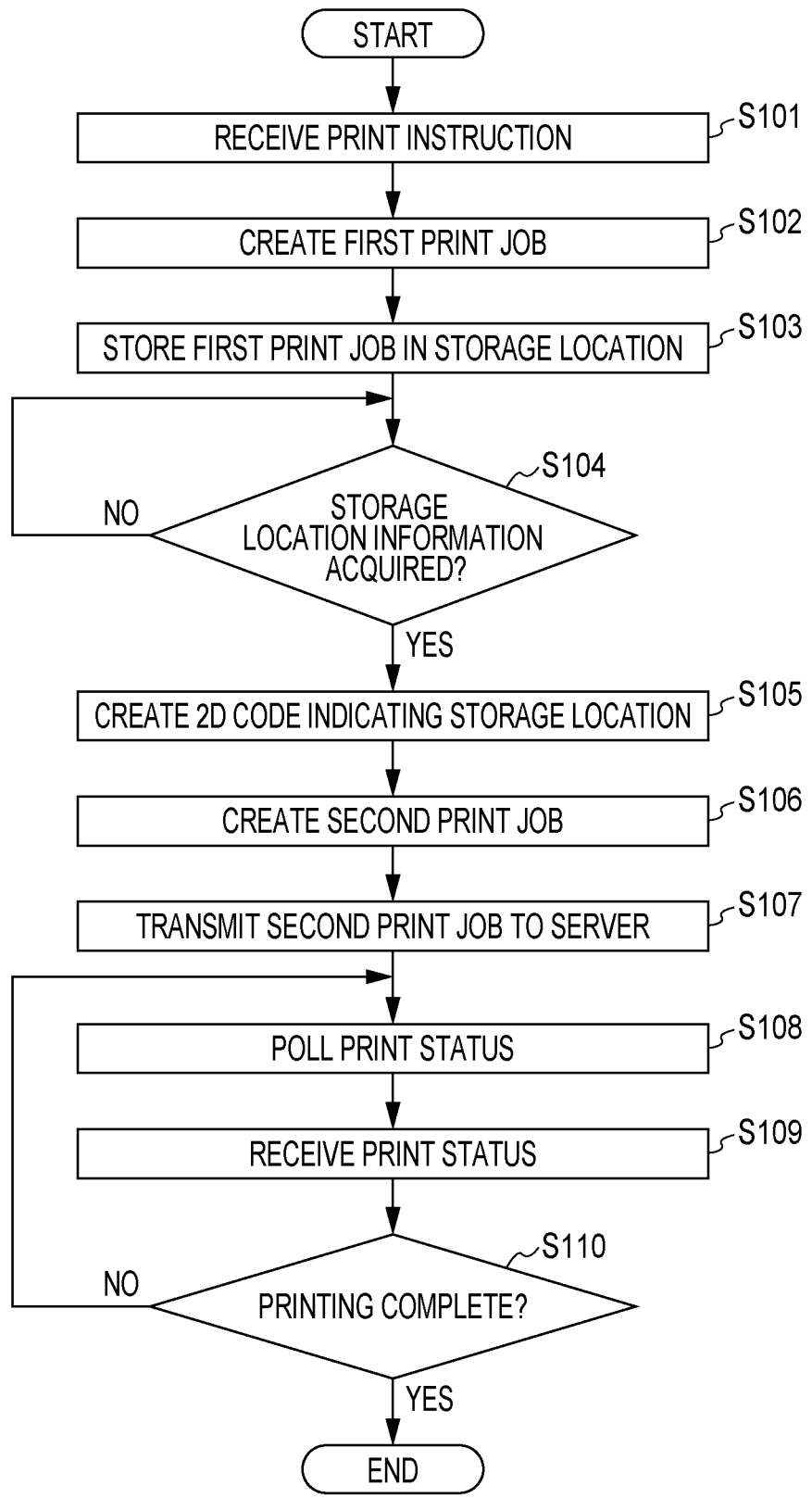
FIG. 8 is a flowchart illustrating a flow of print processes handled by a user terminal.

FIG. 8 is a flowchart illustrating a flow of the print processes handled by the user terminal 10. The print processes are performed by having the CPU 11 read out the printing program from the ROM 12 or the storage 14, load the printing program into the RAM 13, and execute the printing program.

Before the print processes illustrated in FIG. 8 are executed, the user creates the first print data D1 on the user terminal 10 in advance (see FIG. 1). The print processes illustrated in FIG. 8 are executed when the user wants to print the first print data D1 using the printer 40. The user uses the input unit 15 of the user terminal 10 to specify the first print data D1 to be printed and also input print settings and a print instruction for printing the first print data D1.

When the first print data D1 is specified and the print settings and print instruction are input by the user, the CPU 11 receives the print instruction (step S101).

The CPU 11 creates the first print job J1 for printing the first print data D1 (step S102). The first print job J1 includes the first print data D1 and print settings information for causing the printer 40 to achieve functions other than the above "limited functions" managed by the server 20. The print functions other than the above "limited functions" include functions such as authentication that permits printing by only a specific user and a per-page color setting.

The CPU 11 stores the first print job J1 in a storage location, namely the cloud storage 30 (step S103).

The CPU 11 determines whether or not storage location information has been acquired from the cloud storage 30 (step S104). In the exemplary embodiment, a storage location URL indicating the cloud storage 30 and account information are acquired as the storage location information.

In the case where the storage location is not acquired (step S104: No), the CPU 11 stands by until the storage location information is acquired.

In the case where the storage location information is acquired (step S104: Yes), the CPU 11 creates the two-dimensional matrix code 60 indicating the storage location (step S105). In the exemplary embodiment, the two-dimensional matrix code 60 indicating a storage location URL and account information is created. For example, a QR code (registered trademark) is created as the two-dimensional matrix code 60. The creation of the two-dimensional matrix code 60 is executed according to a two-dimensional code creation program stored in the ROM 12 or the storage 14.

The CPU 11 creates the second print job J2 including the second print data D2 containing the embedded two-dimensional matrix code 60 (step S106). The second print job J2 includes the print settings of the second print data D2 designating the above "limited functions", and the content of the first print job J1 (for example, the first page of the first print data D1). Because the second print job J2 includes the content of the first print job J1, when checking a job list that includes the second print job J2, for example, the content of the first print job J1 is presented as a preview, causing the user to confirm through the second print job J2 the print job that the user actually wants to print.

The CPU 11 transmits the second print job J2 to the server 20 (step S107). Although described later, after the second print job J2 is transmitted from the user terminal 10, the server 20 transmits the second print job J2 to the printer 40 (see FIG. 10).

After a predetermined amount of time elapses, the CPU 11 polls the storage location, that is, the cloud storage 30, for the print status of the first print job J1 (step S108). The predetermined amount of time is preset to the ordinary amount of time it takes for the server 20 to transmit the second print job J2 to the printer 40, and for the printer 40 to read the storage location information from the two-dimensional code 60 included in the second print job J2 and acquire the first print job J1, for example.

The CPU 11 receives the print status of the first print job J1 from the cloud storage 30 (step S109).

The CPU 11 determines whether or not the printing of the first print job J1 is complete (step S110). In the case where printing is not complete (step 5110: No), the flow returns to the process of step S108.

In the case where printing is complete (step S110: Yes), the processes based on the printing program handled by the user terminal 10 end.

Figure 9:
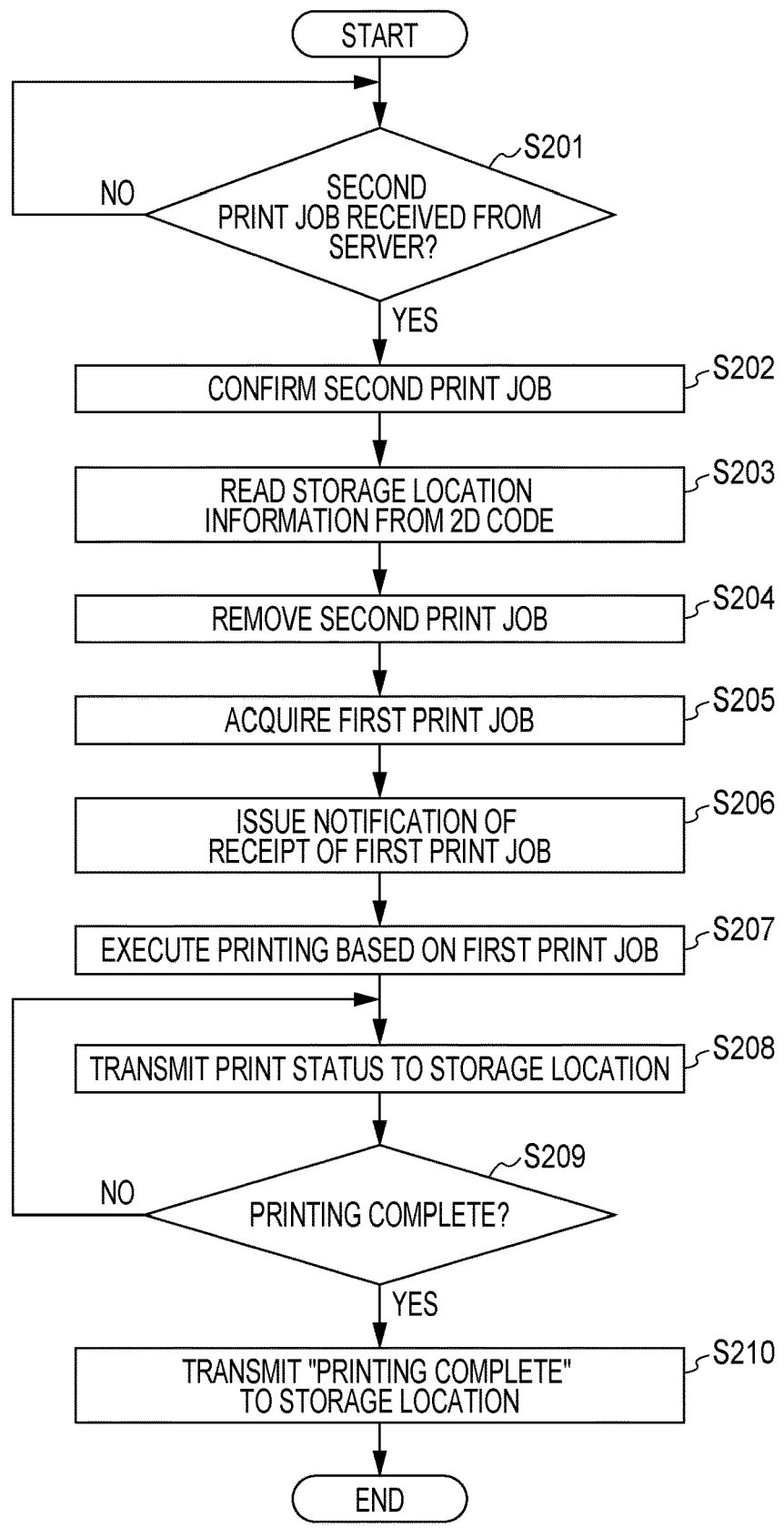
FIG. 9 is a flowchart illustrating a flow of print processes handled by a printer.

FIG. 9 is a flowchart illustrating a flow of the print processes handled by the printer 40. The print processes are performed by having the CPU 41 read out the printing program from the ROM 42 or the storage 44, load the printing program into the RAM 43, and execute the printing program.

The CPU 41 determines whether or not the second print job J2 has been received from the server 20 (step S201). In the case where the second print job J2 has not been received (step S201: No), the CPU 41 stands by until the second print job J2 is received.

In the case where the second print job J2 is received (step S201: Yes), the CPU 41 confirms the second print job J2 (step S202). In the exemplary embodiment, the second print job J2 includes information such as the second print data D2 containing the embedded two-dimensional matrix code 60, and content of the first print job J1 (for example, the first page of the first print data D1).

The CPU 41 reads the storage location information from the two-dimensional matrix code 60 (step S205). In the exemplary embodiment, a storage location URL indicating the cloud storage 30 and account information are read as the storage location information.

The CPU 41 removes the second print job J2 (step S204). With this arrangement, the accidental execution of printing based on the second print job J2 by the printer 40 is avoided.

The CPU 41 acquires the first print job J1 from the cloud storage 30 (step S205).

The CPU 41 notifies the cloud storage 30 that the first print job J1 has been acquired (step S206). At this time, the CPU 41 may notify the cloud storage 30 of the acquisition of the first print job J1 together with the print status of the first print job J1.

The CPU 41 executes printing based on the first print job J1 (step S207). With this arrangement, the first print data D1 is printed onto a recording medium according to the print settings designating functions other than the above "limited functions".

The CPU 41 transmits the print status of the first print job J1 to the cloud storage 30 acting as the storage location (step S208).

The CPU 41 determines whether or not the printing of the first print job J1 is complete (step S209). In the case where the printing of the first print job J1 is not complete (step S209: No), the CPU 41 returns to the process of step S208.

In the case where the printing of the first print job J1 is complete (step S209; Yes), the CPU 41 transmits "printing complete" regarding the first print job J1 to the cloud storage 30 acting as the storage location (step S210). With this arrangement, the processes based on the printing program handled by the printer 40 end.

Figure 10:
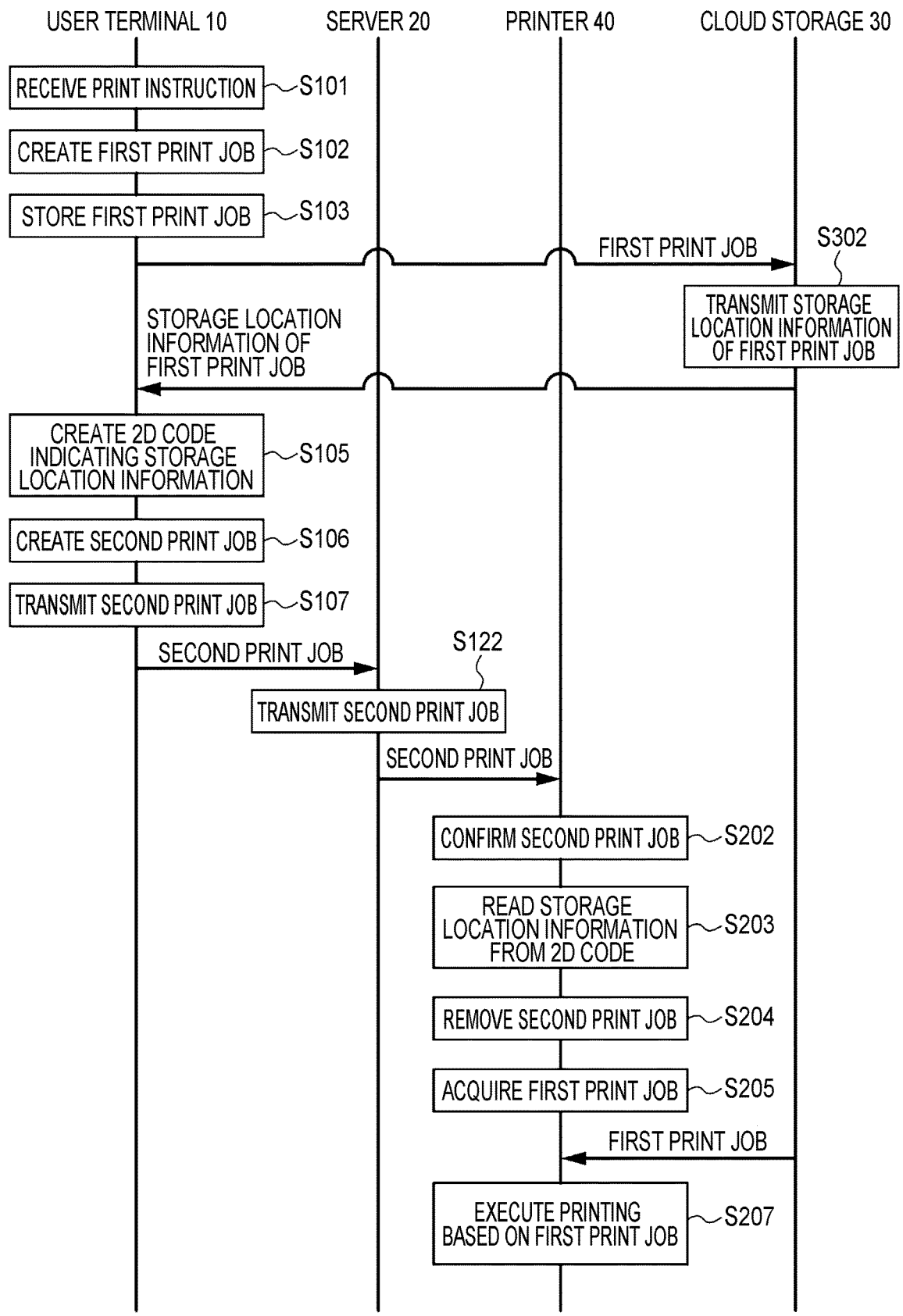
FIG. 10 is a first sequence diagram illustrating an example of a flow of print processes among a user terminal, a server, a printer, and cloud storage in a print system.

Here, FIG. 10 will be used to describe a flow of the printing processes by the print system 1. FIG. 10 is a first sequence diagram illustrating an example of the flow of printing processes by the print system 1. In FIG. 10, steps that are similar to the steps described in the individual printing processes by the user terminal 10, the server 20, the cloud storage 30, and the printer 40 described above are denoted with the same reference signs.

First, the user terminal 10 receives the print instruction (step S101) and creates the first print job J1 (step S102). Additionally, the user terminal 10 stores the first print job J1 in the cloud storage 30 (step S103).

The cloud storage 30 transmits the storage location information of the first print job J1 (step S302).

The user terminal 10 creates the two-dimensional matrix code 60 indicating the storage location information (step S105), and creates the second print job J2 including the second print data D2 containing the embedded two-dimensional matrix code 60 (step S106). Furthermore, the user terminal 10 transmits the second print job J2 to the server 20 (step S107).

The server 20 receives the second print job J2 from the user terminal 10. In the exemplary embodiment, the second print job J2 includes print settings designating functions other than the above "limited functions". The server 20 transmits the second print job J2 to the printer 40 (step S122).

The printer 40 confirms the second print job J2 (step S202), and reads the storage location information from the two-dimensional code 60 (step S203). Additionally, the printer 40 removes the second print job J2 (step S204).

The printer 40 acquires the first print job J1 from the cloud storage 30 (step 5205) and executes printing based on the first print job J1 (step S207).

Figure 11:
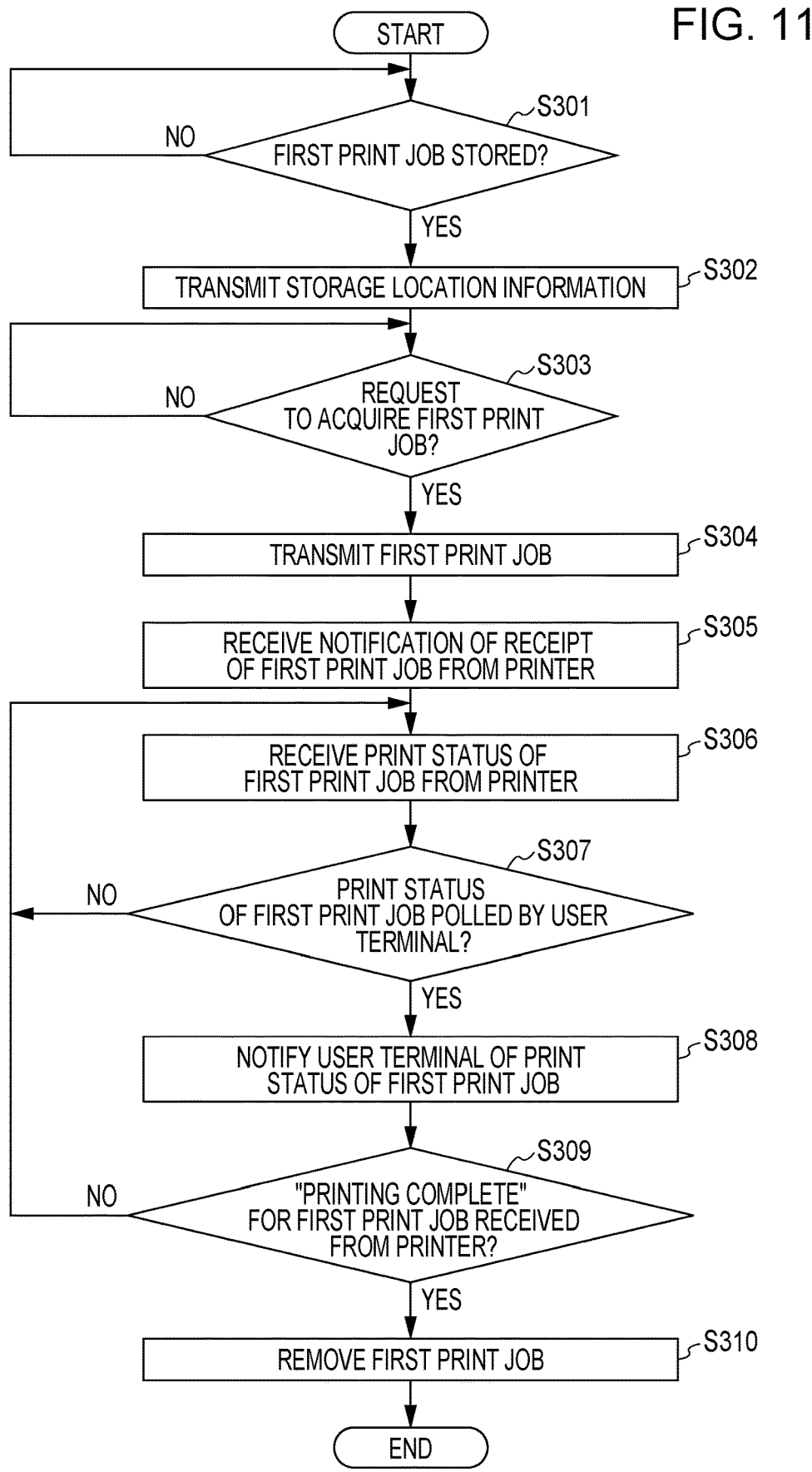
FIG. 11 is a flowchart illustrating a flow of print processes handled by cloud storage.

FIG. 11 is a flowchart illustrating a flow of print processes handled by the cloud storage 30. The print processes are performed by having the CPU 31 read out the printing program from the ROM 32 or the storage 34, load the printing program into the RAM 33, and execute the printing program.

The CPU 31 determines whether or not the first print job J1 from the user terminal 10 has been stored (step S301). In the case where the first print job J1 has not been stored (step S301: No), the CPU 31 stands by until the first print job J1 is stored.

In the case where the first print job J1 is stored (step S301: Yes), the CPU 31 transmits storage location information to the user terminal 10 (step S302). In the exemplary embodiment, a storage location and account information are transmitted as the storage location information.

The CPU 31 determines whether or not the printer 40 has made a request to acquire the first print job J1 (step S303). In the case where the request to acquire the first print job J1 has not been made (step S303: No), the CPU 31 stands by until the request to acquire the first print job J1 is made.

In the case where the request to acquire the first print job J1 is made (step S303: Yes), the CPU 31 transmits the first print job J1 to the printer 40 (step S304).

The CPU 31 receives a notification of receipt of the first print job J1 from the printer 40 (step S305). At this time, the CPU 31 may receive a notification of receipt of the first print job J1 together with the print status of the first print job J1 from the printer 40.

The CPU 31 receives the print status of the first print job J1 from the printer 40 (step S306).

The CPU 31 determines whether or not the print status of the first print job J1 has been polled by the user terminal 10 (step S307). In the case where the user terminal 10 has not polled the print status of the first print job J1 (step S307: No), the CPU 31 returns to the process of step S306.

In the case where the user terminal 10 has polled the print status of the first print job J1 (step S307: Yes), the CPU 31 notifies the user terminal 10 of the print status of the first print job J1 (step S308).

The CPU 31 determines whether or not "printing complete" regarding the first print job J1 has been received from the printer 40 (step S309). In the case where "printing complete" regarding the first print job J1 has not been received from the printer 40 (step S309: No), the CPU 31 returns to the process of step 5306.

In the case where "printing complete" regarding the first print job J1 has been received from the printer 40 (step S309: Yes), the CPU 31 removes the first print job J1 (step S310). With this arrangement, the processes based on the printing program handled by the cloud storage 30 end.

Figure 12:
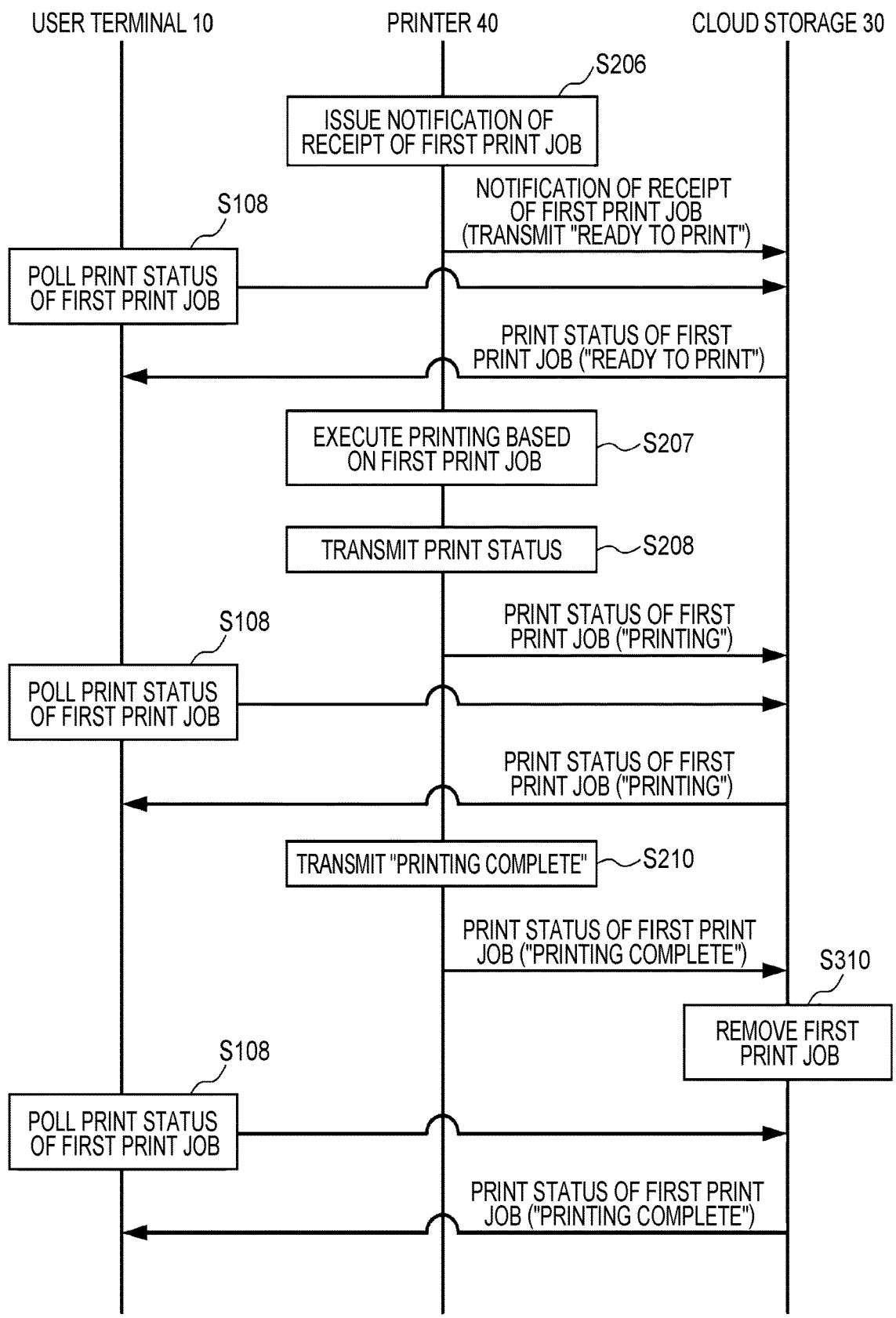
FIG. 12 is a second sequence diagram illustrating an example of a flow of print processes among a user terminal, a printer, and cloud storage in a print system.

Here, FIG. 12 will be used to describe a flow of the printing processes by the print system 1. FIG. 12 is a second sequence diagram illustrating an example of the flow of printing processes by the print system 1, and is executed after the flow of the printing processes by the print system 1 illustrated in FIG. 10. In FIG. 12, steps that are similar to the steps described in the individual printing processes by the user terminal 10, the cloud storage 30, and the printer 40 described above are denoted with the same reference signs.

The printer 40 notifies the cloud storage 30 of the receipt of the first print job J1 (step S206). At this time, the printer 40 may also transmit the print status of the first print job J1 (in this example, "ready to print") to the cloud storage 30.

In this state, if the user terminal 10 polls the cloud storage 30 for the print status of the first print job J1 (step S108), the cloud storage 30 notifies the user terminal 10 of the print status of the first print job J1 (in this example, "ready to print").

The printer 40 executes printing based on the first print job J1 (step S207). The printer 40 transmits the print status of the first print job J1 (in this example, "printing") to the cloud storage 30 (step S208).

In this state, if the user terminal 10 polls the cloud storage 30 for the print status of the first print job J1 (step S108), the cloud storage 30 notifies the user terminal 10 of the print status of the first print job J1 (in this example, "printing").

When the printing of the first print job J1 is complete, the printer 40 transmits "printing complete" regarding the first print job J1 to the cloud storage 30 (step S210). When "printing complete" regarding the first print job J1 is received, the cloud storage 30 removes the first print job J1 (step S310).

In this state, if the user terminal 10 polls the cloud storage 30 for the print status of the first print job J1 (step S108), the cloud storage 30 notifies the user terminal 10 of the print status of the first print job J1 (in this example, "printing complete").

Note that although the exemplary embodiment uses the second print job J2 including the second print data D2 containing the embedded two-dimensional matrix code 60 indicating the storage location, the present disclosure is not limited thereto. For example, a second print job including print data containing an embedded note (that is, an annotation) indicating the storage location may also be used.

Also, in the printer 40, the second print job J2 is removed after reading the storage location information, but the present disclosure is not limited thereto. For example, the printer 40 may also perform a process such that the second print job J2 is not printed after the storage location information is read.

Also, the printer 40 transmits "printing complete" regarding the first print job J1 to the cloud storage 30 when the printing of all of the first print job J1 is complete, but the present disclosure is not limited thereto. For example, the printer 40 may transmit "printing complete" regarding the first print job J1 to the cloud storage 30 when the second print job J2 is removed.

Also, in the print system 1, the user terminal 10 is notified of the print status of the first print job J1 when the user terminal 10 polls the cloud storage 30 for the print status of the first print job J1, but the present disclosure is not limited thereto. For example, the user terminal 10 may be periodically notified of the print status of the first print job J1 by the cloud storage 30, even in cases where the user terminal 10 does not poll the print status of the first print job J1.

The processes by the user terminal 10 and the printer 40 above may also be achieved by dedicated hardware circuits. In this case, the processes may be executed by a single piece of hardware or by multiple pieces of hardware.

Also, a program that causes the user terminal 10 and the printer 40 to operate may be provided by a non-transitory computer-readable recording medium such as Universal Serial Bus (USB) memory, a flexible disk, or a Compact Disc-Read-Only Memory (CD-ROM) disc, and may also be provided online over a network such as the Internet. In this case, the program recorded onto the non-transitory computer-readable recording medium is normally transferred and stored in memory, storage, or the like. Additionally, for example, the program may be provided as standalone application software, or the program may be incorporated into the software of each device as a function of the user terminal 10 and the printer 40.

Also, in the exemplary embodiment, there is one printer 40, but the present disclosure is also applicable to a print system that selects a printer from among multiple printers.

The same also applies to the case in which a universal printer driver is installed in the user terminal 10. In other words, because a universal printer driver is a printer driver that may be used in common by a variety of printers, the print settings made available by the printer driver are limited. Even in such a case, a first print job designating functions other than the limited functions is stored in the cloud storage 30, and a second print job including print data containing embedded storage location information is transmitted to the printer 40 through the server 20. This arrangement makes it possible to print the first print job with print settings other than the limited functions on the printer 40.

Also, in the exemplary embodiment above, the server 20 that provides a service using the cloud is used, but the present disclosure is not limited thereto. For example, the present disclosure is also applicable to a case in which a relay unit of a service other than a cloud service relays the second print job.

Also, in the exemplary embodiment above, a first print job to be printed on the printer 40 is stored in the cloud storage 30, but the present disclosure is not limited thereto. For example, the first print job may also be stored in a storage unit such as a server, and the first print job may be acquired by the printer 40 reading a link.

The foregoing describes a specific exemplary embodiment of the present disclosure in detail, but the present disclosure is not limited to such an exemplary embodiment, and it should be clear to persons skilled in the art that a variety of other embodiments are possible within the scope of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printer comprising:
   a first processor programmed to function as:
   a reception unit that receives a second print job including print data containing embedded storage location information indicating a storage location of a first print job from a server that receives a print job from a user terminal, transmits the second print job which designates limited functions to the printer, the limited functions being a limited subset of functions that a printer treated as a relay destination is capable of achieving, and does not transmit the first print job, which designates a function other than the limited functions, to the printer;
   an acquisition unit that acquires the first print job from the storage location indicated by the storage location information; and
   a printing unit that executes printing based on the first print job.

2. The printer according to claim 1, wherein
   the printing unit does not execute printing based on the second print job.

3. The printer according to claim 2, wherein
   the printing unit removes the second print job after reading the storage location information.

4. The printer according to claim 1, wherein
   the storage location information is a two-dimensional matrix code.

5. The printer according to claim 2, wherein
   the storage location information is a two-dimensional matrix code.

6. The printer according to claim 3, wherein
   the storage location information is a two-dimensional matrix code.

7. The printer according to claim 1, wherein
   content of the first print job is included in the second print job.

8. The printer according to claim 7, wherein
   the content of the first print job is print data included in the first print job.

9. The printer according to claim 8, wherein
   the content of the first print job does not include a portion of the print data included in the first print job.

10. A non-transitory computer readable medium storing a program causing a computer to execute a process for printing, the process comprising:
    receiving a second print job including print data containing embedded storage location information indicating a storage location of a first print job from a server that receives a print job from a user terminal, transmits the second print job which designates limited functions to the printer, the limited functions being a limited subset of functions that a printer treated as a relay destination is capable of achieving, and does not transmit the first print job, which designates a function other than the limited functions, to the printer;
    acquiring the first print job from the storage location indicated by the storage location information; and
    executing printing based on the first print job.

11. A print system comprising:
    the printer according to claim 1;
    a user terminal that creates and transmits a print job; and
    the server that receives the print job from the user terminal, transmits the print job designating limited functions to the printer, the limited functions being a limited subset of functions that the printer treated as a relay destination is capable of achieving, and does not transmit the print job designating a function other than the limited functions to the printer, wherein
    the user terminal causes the first print job designating a function other than the limited functions to be stored in a predetermined storage location, creates a second print job including print data containing embedded storage location information indicating the storage location, and transmits the second print job to the server.

12. The print system according to claim 11, further comprising:
    a storage unit having a memory in which the first print job is stored, wherein
    the printer includes a second processor programmed to function as a transmission unit that transmits a print status based on the first print job to the storage unit.

13. The print system according to claim 12, wherein
    the transmission unit transmits information about a completion of printing to the storage unit after printing based on the first print job is executed.

14. The print system according to claim 13, wherein the storage unit removes the first print job after receiving the information about the completion of printing.

15. The print system according to claim 12, wherein the storage unit is provided with a third processor programmed to function as a notification unit for notifying the user terminal of the print status based on the first print job.

16. The print system according to claim 13, wherein the storage unit is provided with a notification unit for notifying the user terminal of the print status based on the first print job.

17. The print system according to claim 14, wherein the storage unit is provided with a notification unit for notifying the user terminal of the print status based on the first print job.

18. The print system according to claim 15, wherein the notification unit notifies the user terminal of the print status based on the first print job in response to polling by the user terminal.

19. The print system according to claim 15, wherein the notification unit notifies the user terminal of a completion of printing after receiving information about a completion of printing from the transmission unit.

20. The print system according to claim 18, wherein the notification unit notifies the user terminal of a completion of printing after receiving information about a completion of printing from the transmission unit.

* * * * *